June 25, 1963     J. O. HELVERN     3,094,844

POWER BRAKE BOOSTER

Filed Aug. 7, 1961

INVENTOR.
JAMES O. HELVERN
BY D. C. Staley
HIS ATTORNEY

United States Patent Office 3,094,844
Patented June 25, 1963

3,094,844
POWER BRAKE BOOSTER
James O. Helvern, Lewisburg, Ohio, assignor to General Motors Corporation, Detroit, Mich., a corporation of Delaware
Filed Aug. 7, 1961, Ser. No. 129,789
5 Claims. (Cl. 60—54.6)

This invention relates to power brake booster units adapted for use on motor vehicles and particularly to the type of unit wherein subatmospheric pressure, or vacuum, is normally maintained in the power chamber of the booster unit.

One of the problems relating to power brake booster units of the type wherein subatmospheric pressure is maintained in the power chamber of the unit, such as vacuum obtained from the manifold of the vehicle engine on which the brake booster unit is used, is that of preventing the hydraulic fluid from the reservoir of the master cylinder from being drawn into the power chamber of the brake booster unit in the event the seals on the master cylinder piston provided between the master cylinder and the brake booster unit should become worn or leak for any reason. With the end of the master cylinder and the master cylinder piston, that reciprocates therein, both exposed to the subatmosphere pressure in the booster unit, that is the vacuum from the manifold of the engine, there is always a tendency for the low pressure, or vacuum, in the power chamber of the unit to draw hydraulic fluid from the reservoir of the master cylinder into the power chamber of the brake booster unit.

It is therefore an object of this invention to provide a power brake booster unit wherein the seal structure normally provided between the piston and the cylinder wall of the master cylinder is arranged so that atmospheric pressure is present between a pair of axially spaced seal elements so that the effect of the vacuum or subatmosphere pressure in the power chamber of the brake booster unit is broken by an annular ring of atmospheric pressure at the periphery of the master cylinder piston between the two secondary axially spaced seal elements provided at the subatmospheric pressure chamber end of the brake booster unit.

It is still another object of the invention to provide a structure in accordance with the foregoing object wherein the atmospheric air that is provided to the periphery of the master cylinder piston, at the subatmospheric pressure chamber end thereof, is obtained from a filtered source of air such as that which is supplied to the power chamber side of the brake booster unit so that a common source of filtered air can be supplied to both the variable pressure side of the brake booster unit and the atmospheric pressure area between the secondary seals of the master cylinder piston. Preferably this air is taken from the passenger compartment of the vehicle to eliminate as much dirt as possible from entering the unit.

Further objects and advantages of the present invention will be apparent from the following description, reference being had to the accompanying drawings wherein a preferred embodiment of the present invention is clearly shown.

In the single FIGURE of drawings presented herewith the power brake booster unit consists of a housing 10 formed of two wall shells 11 and 12 secured together by a bayonet lock arrangement 9. The housing 10 is divided into two compartments 13 and 14 by means of a movable power wall 15. A rolling diaphragm 16 has one end thereof secured to the power wall 15 by a ring member 17 and the opposite end secured to the power wall 15 by a ring member 17 and the opposite end secured between the shells 11 and 12 in the form of an enlarged bead 18. The rolling diaphragm 16 together with the power wall 15 separates the power chamber into the two compartments 13 and 14 heretofore mentioned.

The power wall 15 is positioned normally as shown in the drawing by means of a retraction spring 19 positioned between the shell 11 and the power wall.

The chamber wall 11 is provided with a fitting 21 adapted to be connected through a flexible conduit with the manifold of the engine of the vehicle on which the power unit is placed for supply of a subatmospheric pressure continuously to the chamber 13 in the form of a vacuum obtained from the manifold of the engine.

The power wall 15 contains a control valve 25 that regulates the flow of subatmosphere pressure, or vacuum, as well as atmospheric air pressure to the chamber 14 by which the power wall 15 is moved forward, that is a lefthand direction, when atmospheric air is permitted to enter the chamber 14, chamber 13 still remaining under the subatmospheric pressure or vacuum established by the manifold of the vehicle engine.

The control valve 25 consists of a body member 26 carried on the power wall 15 in a chamber 27 formed between the main portion of the power wall and the retainer member 28. The body member 26 has an axial bore 29 that slidably receives a valve element 30 that is actuated manually through a push rod 31 connected in any suitable manner with the brake pedal 32. A diaphragm 33 extends between the body 26 and the valve element 30 to close the chamber 35 from fluid flow connection with an annular chamber 36 provided in the body 26 around the valve element 30. The chamber 36 communicates with the chamber 14 by means of the passage 37, and when the valve structure is in the position shown in the drawing also communicates with the chamber 13 through the passages 38 and 39.

An annular valve member 40 is supported by the diaphragm portion 41 on the power wall 15, a metal ring 42 retaining the valve member in position between the wall 15 and the housing 26. This valve member 40 normally engages an air valve seat 44, spring member 45 urging valve member 30 against the valve element 40 to retain the air valve seat 44 in engagement with the valve member 40 and thereby prevent delivery of air from the atmosphere chamber 46 to chamber 14 of the power unit. At this time the vacuum valve seat 50 is disengaged from the valve member 40 so that subatmosphere pressure is present in the chamber 36 for delivery into the chamber 14 whereby chambers 13 and 14 are at the same subatmosphere pressure or vacuum when the power unit is in the retracted position as shown in the drawing.

Spring 51 urges valve element 40 against the seat 44, spring 45 normally positioning the valve member 30 as shown in the drawing with the valve element 40 disengaged from the vacuum seat 50.

A plunger member 60 is carried by the power wall 15 and has its forward end 61 engaging the bottom wall of a recess 62 provided in the master cylinder piston 63 that is reciprocable in the cylinder bore 64 of the master cylinder 65.

The master cylinder piston 63 is provided with a forward annular portion 66 that supports a cup seal 67 in the forward part of the master cylinder bore 64, a spring 68 normally positioning the master cylinder piston as shown in the drawing in the retracted position of the power unit. The spring 68 also engages a valve element 69 seated on a rubber disk 71 of a residual pressure check valve 70 provided in the outlet end of the master cylinder that has the outlet passage 72 adapted for connection with brake cylinders 73 in each of the wheel brakes of the vehicle.

The master cylinder 65 has a reservoir 75 closed by a cap member 76, the reservoir being connected with the cylinder bore 64 through a port 77 positioned just ahead of the cup seal 67 when the master cylinder is in the retracted position shown in the drawing. The reservoir 75 is also in communication with an annular chamber 78 by means of port 79 that is in the center portion of the master cylinder piston 63 between the end portion 66 and the end portion 80.

The end portion 80 of the piston 63 has a pair of seal members 81 and 82 positioned in annular grooves 83 and 84, respectively, to effect a seal between the chamber 78 in the cylinder bore 64 and the chamber 13 of the power unit.

Since the power unit is normally under subatmosphere pressure, or vacuum, particularly chamber 13, the open end portion 81 of the master cylinder 65 is exposed to the subatmosphere pressure, or vacuum, in the chamber 13 as is the end 82 of the master cylinder piston 63. Therefore, with the reservoir 75 under atmospheric pressure and with the end portions 81 and 82 of the cylinder and piston, respectively, exposed to subatmosphere pressure, or vacuum, there is a considerable pressure differential across the seal elements 81 and 82 which tends to draw hydraulic fluid from the annular chamber 78 into the subatmosphere chamber 13 of the power unit. If the seal members 81 and 82 have any tendency whatever to leak, there will be a passage of brake fluid from the reservoir 75 into the subatmosphere chamber 13 of the power unit. This situation has caused some difficulty in power brake boosters of the so-called vacuum suspended type and it is the purpose of this invention to eliminate this problem.

The plunger member 60 that extends into the recess chamber 62 of the piston 63 carries a seal member 90 that engages the inner periphery of the recess chamber 62 thereby forming a closed chamber space 91 around the forward end of the plunger member 60.

As will be seen from the drawing, the end portion 80 of the piston 63 has the seal elements 81 and 82 positioned in spaced axial relationship on the piston 63 so as to provide an annular peripheral portion 95 that spaces the seal elements 81 and 82 with the peripheral surface of the annular portion 95 in sliding engagement with the cylinder bore 64. One or more radial passages 96 extend from the closed space 91 to the periphery of the annular portion 95 so that pressure present in the chamber 91 is also present at the peripheral surface of the portion 95. The arrangement is such that with atmospheric pressure present in chamber 91 and in the radial passage 96 there is provided an annular ring of atmospheric pressure at the periphery of the portion 95 between seals 81 and 82 thereby breaking the effect of the subatmosphere pressure or vacuum in the chamber 13 to draw fluid in the chamber 78 past the seal element 81, the peripheral ring of atmosphere pressure between the surfaces of the portion 95 and the cylinder bore 64 preventing the subatmosphere pressure or vacuum in chamber 13 having effect past the annular portion 95.

The chamber space 91 receives atmosphere pressure through a radial passage 100 provided in the plunger member 60 that communicates with an axial bore 101 that communicates with the chamber 102 in the valve element 30. Chamber 102 connects by way of one or more passages 103 with the air chamber space 46 and it in turn communicates through the radial passage 104 with the chamber 105 in the extension 106 on the wall 15, chamber 105 in turn being connected with the chamber space 107 between the member 106 and the dirt boot 108. Chamber 107 communicates with the atmosphere through passage 109 to receive filtered air through the filter element 110.

In the arrangement thus disclosed the air that is supplied through the filter element 110 supplies the air that is under control of the valve member 30 for supply to the chamber 14 as well as that which is supplied to the passage 96 in the piston member 63. Since the wall portion 12 is normally in the passenger compartment of the vehicle, cleaner air will be taken through the filter than if the device were placed in the engine compartment.

It will be apparent that reciprocation of the piston 63 in the cylinder bore 64 will retain the annular ring of atmospheric air around the portion 95 of the piston irrespective of the position of the piston in the cylinder bore so that the effect of the subatmosphere pressure or vacuum in chamber 13 is constantly broken at the peripheral surface of the portion 95 of the piston 63, thereby preventing hydraulic fluid being drawn from the reservoir because of pressure differential across the portion 80 of the piston at any time during the stroke of operation of the piston in the master cylinder.

While the embodiment of the present invention as herein disclosed constitutes a preferred form, it is to be understood that other forms might be adopted.

What is claimed is as follows:

1. In a vacuum suspended power brake booster unit, the combination of, a power chamber, a movable wall in said power chamber dividing the same into two compartments the first of which is continuously maintained at subatmospheric pressure and the second of which is subject to subatmospheric pressure variable to atmospheric pressure, valve means controlling admission of atmospheric pressure to said second compartment to effect pressure variation therein to move said movable wall thereby, atmosphere passage means conducting air to said valve means, a master cylinder on a wall of said first compartment and having an open end subject to the subatmosphere pressure in said first compartment, a master cylinder piston reciprocable in said cylinder and having one end subject to the subatmospheric pressure in said first compartment, means between said piston and said movable wall to effect movement of said piston in said cylinder, first and second seal members between said cylinder and said piston at said one end thereof spaced axially of the piston, atmosphere passage means in said piston terminating at the periphery of said piston between said first and second seal members, and additional passage means connecting said last-mentioned passage means with said first-mentioned passage means to provide a common source from which atmospheric air is supplied to said valve means and second-mentioned passage means.

2. Apparatus constructed and arranged in accordance with the structure set forth in claim 1 wherein said additional passage means includes passage means through said valve means and through said means connecting said piston with said movable wall through which atmospheric air passes to the said first-mentioned passage means in said piston.

3. In a vacuum suspended power brake booster unit, the combination of, a power chamber, a movable wall in said power chamber dividing the same into two compartments the first of which is continuously maintained at subatmospheric pressure and the second of which is subject to subatmospheric pressure variable to atmospheric pressure, valve means in said movable wall controlling admission of atmospheric pressure to said second compartment to effect pressure variation therein to move said movable wall thereby, atmosphere passage means in a wall of said second compartment conducting air to said valve means, a master cylinder on a wall of said first compartment and having an open end subject to the subatmospheric pressure in said first compartment, a master cylinder piston reciprocable in said cylinder and having one end subject to the subatmospheric pressure in said first compartment, plunger means between said piston and said movable wall to effect movement of said piston in said cylinder, first and second seal members between said cylinder and said piston at said one end thereof spaced axially of the piston, atmosphere passage means in said piston terminating at the periphery of said piston between said first and second seal members, and additional passage means in said valve means and in said plunger means connecting said last-mentioned passage means with said first-mentioned passage means to provide a common source from which atmospheric air is supplied to said valve means and said second-mentioned passage means.

4. Apparatus constructed and arranged in accordance with the structure set forth in claim 3 wherein said common source of atmospheric air includes filter means to filter the air supplied to said valve means and said second-mentioned passage means.

5. In a vacuum suspended power brake booster unit, the combination of, a power chamber, a movable wall in said power chamber dividing the same into two compartments the first of which is continuously maintained at subatmospheric pressure and the second of which is subject to subatmospheric pressure variable to atmospheric pressure, valve means in said movable wall controlling admission of atmospheric pressure to said second compartment to effect pressure variation therein to move said movable wall thereby, atmosphere passage means in a wall of said second compartment conducting air to said valve means, a master cylinder on a wall of said first compartment and having an open end subject to the subatmospheric pressure in said first compartment, a master cylinder piston reciprocable in said cylinder and having one end subject to the subatmospheric pressure in said first compartment, plunger means between said piston and said movable wall having one end thereof positioned within a recess in said piston to effect movement of said piston in said cylinder, seal means between said plunger means and said piston means axially spaced from the said one of said plunger means and providing thereby a closed chamber space in the said piston, first and second seal members between said cylinder and said piston at said one end thereof spaced axially of the piston, atmosphere passage means in said piston extending from said closed chamber space therein and terminating at the periphery of said piston between said first and second seal members, and additional passage means connecting said closed chamber space in said piston with said first-mentioned passage means to provide thereby a common source from which atmospheric air is supplied to said valve means and to said second-mentioned passage means.

References Cited in the file of this patent
UNITED STATES PATENTS

| | | |
|---|---|---|
| 1,828,874 | Myers | Oct. 27, 1931 |
| 2,373,272 | Stelzer | Apr. 10, 1945 |